Feb. 9, 1960      I. JEPSON      2,924,698
ELECTRIC HEATING AND COOKING DEVICE
Filed Sept. 23, 1955      3 Sheets-Sheet 1
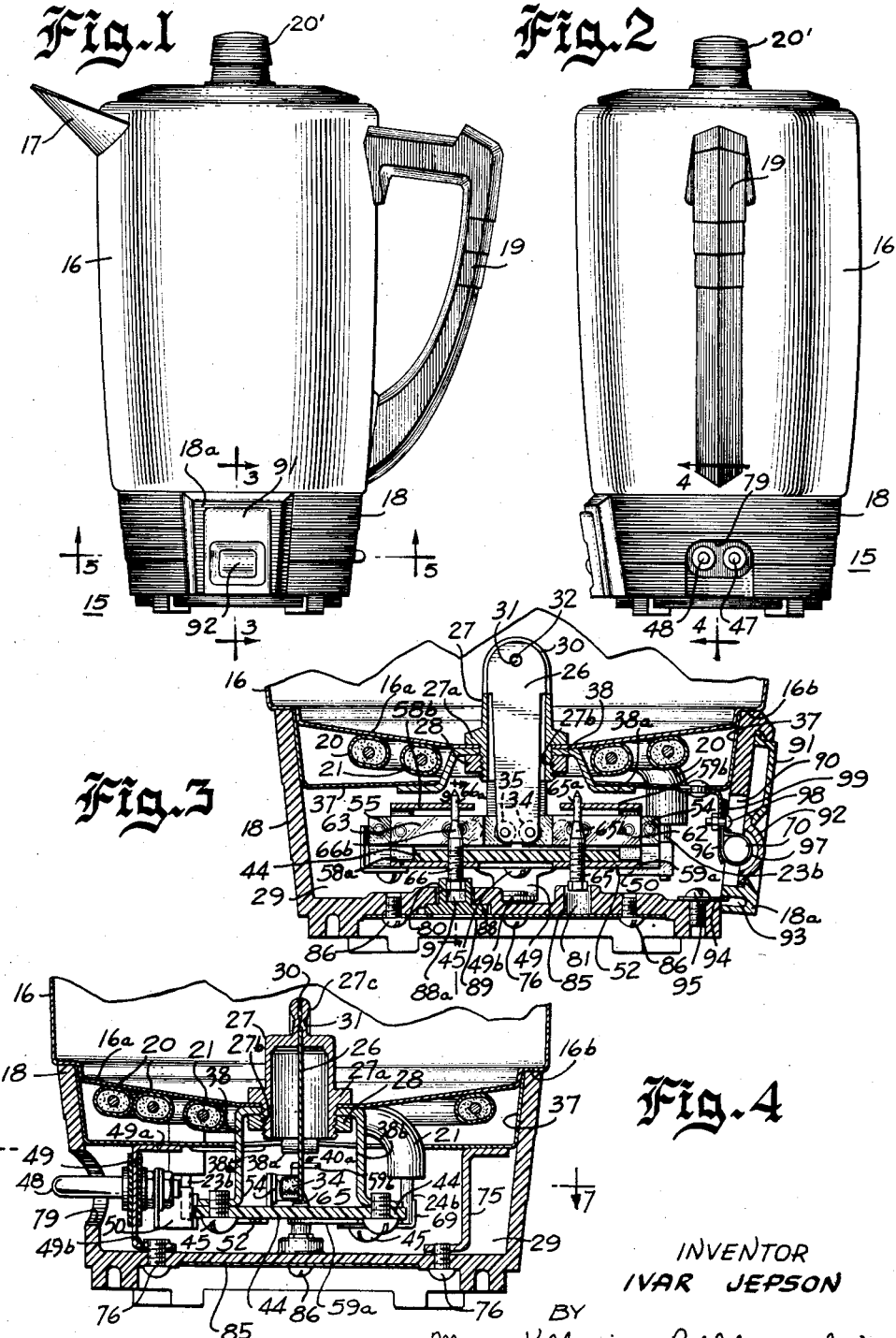
INVENTOR
IVAR JEPSON
BY
Mason, Kolehmainen, Rathburn and Wyss
ATTORNEYS

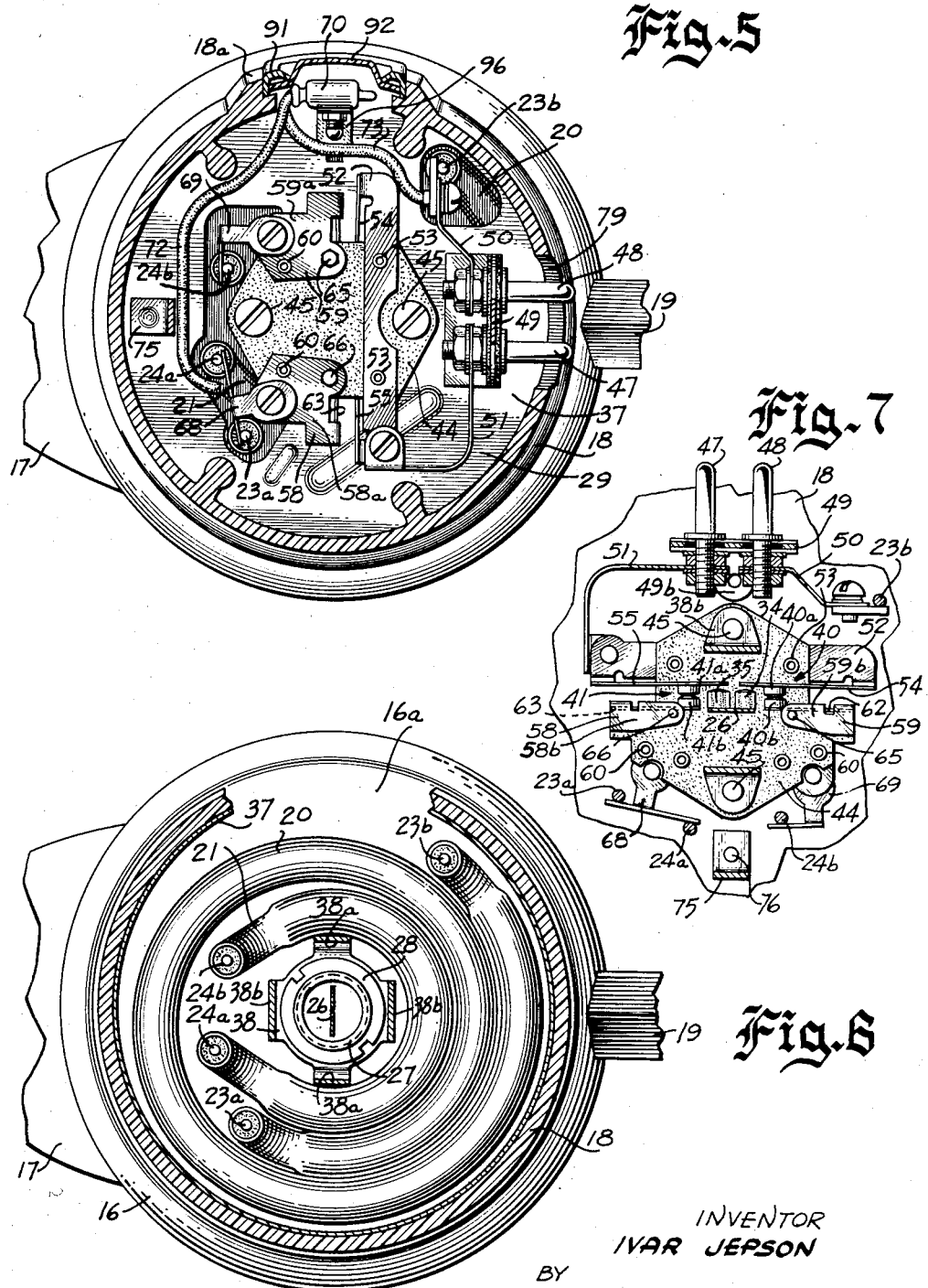

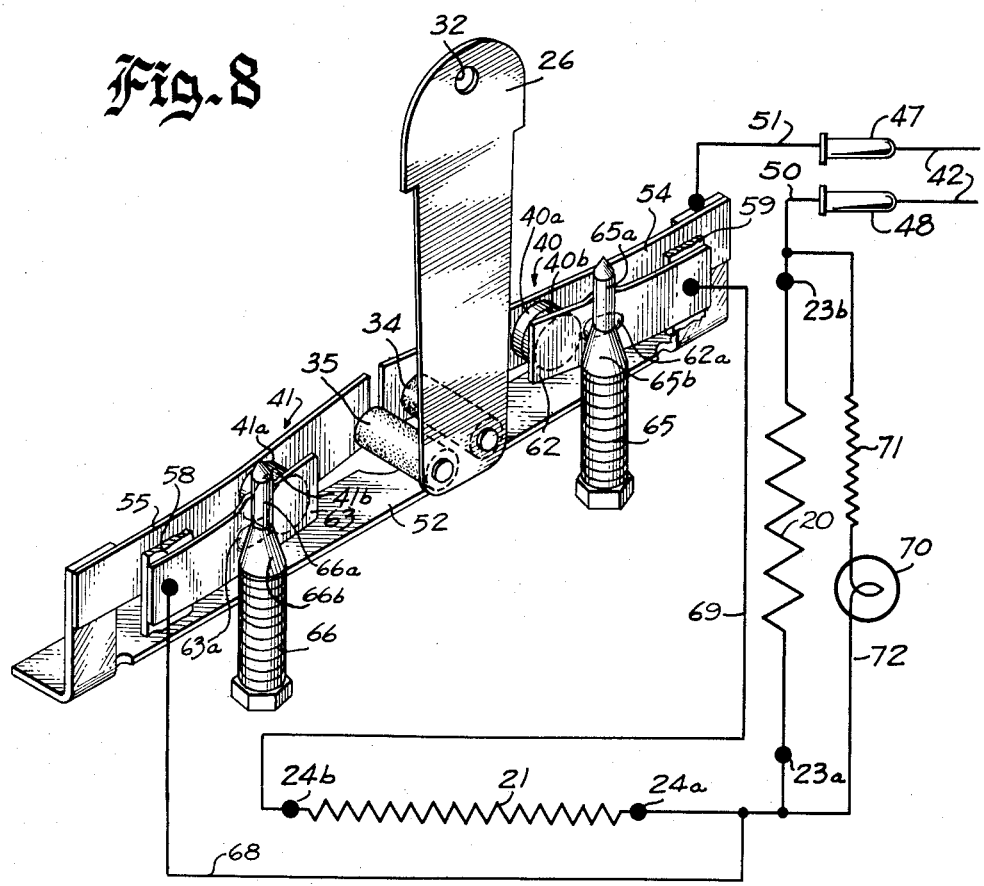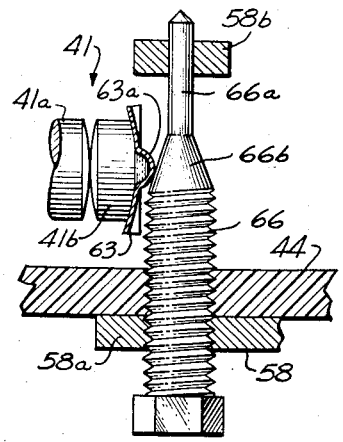

United States Patent Office 2,924,698
Patented Feb. 9, 1960

2,924,698

ELECTRIC HEATING AND COOKING DEVICE

Ivar Jepson, Oak Park, Ill., assignor to Sunbeam Corporation, Chicago, Ill., a corporation of Illinois Application September 23, 1955, Serial No. 536,198

9 Claims. (Cl. 219—44)

The present invention relates to an electric heating and cooking device, and, more particularly, to a device which is commonly referred to as an instant coffee and tea maker.

Although the electric heating and cooking device of the present invention has numerous heating and cooking uses, it is particularly designed for rapidly heating water for use in connection with making what is commonly referred to as instant coffee and instant tea. There have been available on the market for many years products which are referred to as instant coffee in that in making the coffee one merely adds boiling water to the product, resulting in coffee almost instantly made. Almost everyone, of course, is familiar with the method of substantially instantly making tea by immersing a tea bag or the like in very hot water for a short period of time. Such instant hot beverages have become quite popular in recent years. However, there has not been available on the market any device especially adapted for this purpose. First of all, a so-called instant coffee and tea maker should heat water to the desired temperature very quickly, and yet this must be accomplished without boiling over. It will be appreciated that a device for heating water very quickly can readily be obtained by providing an electric heating unit having a very high wattage heating element. Unfortunately, such a device which will bring the water temperature up rapidly will cause the water to boil violently as soon as the boiling point is reached, and if the unit is used to heat the maximum quantity of water, obviously, this violent boiling will cause the hot water to boil over, with the undesirable results to be expected under these circumstances. It would be desirable, therefore, to provide an electric heating device which will heat water or other liquid very rapidly to a temperature just below the boiling point, and then permit a boiling temperature to be obtained without excessive steaming or bubbling, and without boiling over. Such a device should, moreover, maintain the correct water temperature once it has been reached, so that if a second or third cup of coffee or tea is desired, water at the correct temperature for making so-called instant coffee or tea is immediately available. Moreover, such a device should preferably be capable of heating water at room temperature to the desired boiling temperature either in small quantities if only one or two cups of coffee or tea are to be made, or in large quantities so that ten cups can be made. Regardless of whether it is desired to heat water for making one cup or ten cups of instant coffee or tea, the desired water temperature should be obtained, starting with room temperature or below, in a matter of a few minutes, and certainly in less than ten minutes in every case.

In any electric heating or cooking device particularly designed for heating liquids, it is common practice to employ a temperature responsive device in the form of a bimetallic element or the like to provide the desired temperature control. Where a feature of the device is high speed heating, it is apparent that the wall of the container in contact with the heating element is likely to be at a higher temperature than the liquid being heated. To provide accurate control, it is of course essential that the bimetallic element or similar device which provides the temperature control respond to the temperature of the liquid being heated and be more or less independent of the temperature of the heating element. This presents a problem, since the logical arrangement is to support the bimetallic element from the wall of the device being heated. It would be desirable to provide an improved arrangement in a heating or cooking device particularly designed for heating liquids wherein the bimetallic element responds closely to the temperature of the liquid being heated and is more or less independent of the temperature of the heating element or the wall of the container with which the heating element is associated.

In any electric heating device provided with automatic control means for affording a predetermined temperature there is the possibility that all of the material to be heated evaporates or is used up without the device being disconnected from the power source. It would be desirable, therefore, in such a unit to provide safety means which will insure against overheating should the operator empty the device without disconnecting the power, or should the unit run dry for other reasons.

Water used for making so-called instant coffee or instant tea should be at approximately boiling temperature for most satisfactory operation. If a device is provided which heats water just below boiling temperature very rapidly and then comes up to final temperature without excessive bubbling or boiling over, there is the possibility that if the device is used at higher elevations, such as substantially of seal level where the boiling point is lower, excessive boiling might occur at a lower temperature. Such a device, therefore, should have a suitable adjustment which might be referred to as a sea level adjustment to prevent excessive boiling regardless of the elevation relative to sea level where the device might be used.

Accordingly, it is an object of the present invention to provide a new and improved electric heating and cooking device.

It is another object of the present invention to provide an improved liquid heating device having the desirable features enumerated above.

It is another object of the present invention to provide a suitable instant coffee and tea maker in which liquid is heated very rapidly to a temperature just below boiling by a high wattage heating element, and thereafter heating is continued to at least the boiling temperature by a lower wattage heating element thereby to prevent excess steaming or bubbling, as well as to prevent boiling over.

It is a further object of the present invention to provide an improved electric control means for an electric liquid heating unit which will insure heating any quantity of liquid within the capacity of the unit to boiling temperature within a very short time without boiling over, and thereafter maintaining such liquid at such high temperature.

Still another object of the present invention resides in the provision of an electric heating and cooking device having very simple control means for insuring high speed heating without excessive steaming and bubbling or boiling over within a minimum period, which is simple in construction, foolproof in operation, and which is capable of giving many years of satisfactory service.

It is another object of the present invention to provide a liquid heating device having means for automatically controlling the temperature, in which the same performance is assured whether large or small quantities of liquid are being heated, and in which the temperature responsive means are dependent primarily on the temperature of the liquid being heated rather than on the temperature of the vessel walls.

Still another object of the present invention resides in an improved automatic temperature control means having a heating unit in which all current carrying parts connected to a control switch operated by the temperature responsive control means are mounted on a single plate of insulating material thereby eliminating the requirement of a large number of independent insulating members.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

Fig. 1 is a side elevational view of a heating and cooking device embodying the present invention;

Fig. 2 is an elevational view similar to Fig. 1, effectively comprising a right-hand elevational view of Fig. 1;

Fig. 3 is an enlarged sectional view of a portion of the heating device of Fig. 1 taken on line 3—3 of Fig. 1;

Fig. 4 is an enlarged fragmentary sectional view similar to Fig. 3 taken on line 4—4 of Fig. 2;

Fig. 5 is an enlarged sectional view taken on line 5—5 of Fig. 1;

Fig. 6 is a view similar to Fig. 5 but with portions of the control means cut away to show the heating units employed for supplying the heat energy to the electric heating device of the present invention;

Fig. 7 is a fragmentary sectional view taken substantially on line 7—7 of Fig. 4, assuming that Fig. 4 shows the complete structure;

Fig. 8 is a schematic circuit diagram showing the electric control circuit of the heating device of the present invention; and Fig. 9 is an enlarged sectional view taken on line 9—9 of Fig. 3.

The present invention is primarily concerned with an electric heating unit comprising a vessel to the bottom of which two heating elements are secured in intimate heat exchange relationship therewith. One of these elements is a high wattage element of the order of 1150 watts, while the other is a low wattage element of the order of 200 watts, assuming the standard alternating current supply voltage employed in this country. A temperature responsive device is provided mounted in an inverted cup-shaped unit which device actuates two independent switches. One of these switches is in series only with the high wattage element and when it opens it connects the high wattage element in series with the low wattage element and in series with the other switch. The first switch opens at a temperature just below boiling, after which an effective low wattage unit comprising the high and low wattage elements in series performs the heating function. The other switch interrupts all heating current in the event the vessel should boil dry. Means are provided to give accurate control of the effectiveness of the high wattage element when used at different altitudes with the consequent variation in boiling points. The invention further includes simplified means for supporting the conducting elements in insulated relationship, and certain other details of construction.

Referring now to the drawings, there is illustrated in Figs. 1 and 2 an electric heating and cooking device, generally designated by the reference numeral 15, which heating device is particularly designed for use as what is commonly termed an instant coffee and tea maker. Obviously, this heating device may have any desired design.

As illustrated in Figs. 1 and 2 of the drawings, the design is somewhat that of electric coffee makers comprising a vessel 16 having integrally united therewith a suitable pouring spout 17. The vessel 16 is illustrated as being mounted on a suitable base 18. To permit ready handling by the operator, a suitable handle 19 is illustrated as being secured to the vessel 16. A removable cover 20' is preferably provided to close the upper end thereof in a conventional manner. As was pointed out above, the particular configuration of the elements thus far described forms no part of the present invention but is disclosed in a copending design application, now design patent Des. 179,197, granted November 13, 1956, and assigned to the same assignee as the instant application.

As best shown in Figs. 3 and 4 of the drawings, the vessel 16 is provided with a bottom 16a, preferably formed of a good heat conducting material such as copper or the like, which is integrally united with the vessel walls. As illustrated and to facilitate association with the base 18, the bottom 16a is deformed adjacent the periphery thereof into a sort of Z-shaped cross section to define an annular shoulder 16b and thus define a peripheral rabbet on the bottom 16a. The bottom is illustrated as sloping slightly from the shoulder 16b toward the center so as to provide the greatest depth at the center of the bottom. Preferably, the bottom 16a as well as the other walls of the vessel 16 provide a smooth surface to facilitate cleaning.

For the purpose of heating the liquid contents of the vessel 16, there are provided two heating elements specifically designated by the reference numerals 20 and 21, respectively. Preferably each of the heating elements 20 and 21 is of the well-known sheathed type. Such heating elements comprise a helical resistance conductor mounted in an outer metallic sheath and supported in spaced relationship with reference to the sheath by an electrical insulating heat conducting mass formed of a suitable material which is a good electrical insulator and at the same time a fairly good conductor of heat. Such material as highly compressed magnesium oxide is often employed for this purpose.

As illustrated in the drawings, and specifically in Fig. 6 thereof, the heating elements 20 and 21 are in the form of concentric rings, with the element 21 comprising the low wattage heating element, being formed in a ring of relatively small diameter closely adjacent the central portion of the bottom wall 16a of the vessel 16. The element 20, on the other hand, is a high wattage element which surrounds the low wattage element 21, and in effect comprises more than a single turn. It is somewhat remote from the central portion of the bottom 16a. The two heating elements 20 and 21 are preferably secured to the bottom 16a of the vessel 16 in intimate heat exchange relationship therewith as by welding, brazing, silver soldering or the like. In an embodiment constructed in accordance with the present invention, the high wattage element at the standard alternating current voltage of 115 volts had a heating output of approximately 1150 watts, and preferably between 1000 and 1200 watts. The low wattage element for the same voltage had a heating capacity of approximately 200 watts, and within a range of 150 to 250 watts. The high wattage element 20 when connected to a source of alternating current is capable of bringing the temperature of any liquid contained within vessel 16 to a high temperature very rapidly. The heating capacity, however, of heating element 20 is so great that the liquid in vessel 16 will reach the boiling point in a very short time, with the result that if it continued to heat the liquid, violent bubbling, steaming and boiling over would result. As will become apparent from the following description, control means are provided to render the high wattage element ineffective at a temperature just below the boiling temperature of the liquid within vessel 16 and to continue heating with means including the low wattage heating element 21, whereby the boiling temperature is obtained without boiling over.

Preferably, the ends of the sheathed heating elements 20 and 21 are bent somewhat at right angles to the plane of the heating elements so as to project downwardly beneath the lower wall 16a, as is indicated in Figs. 3 and 4 of the drawings. Moreover, these heating elements are provided with rigid terminals 23 and 24 but which are specifically designated by the reference numerals 23a and 23b for the heating element 20, and 24a and 24b for the heating element 21. These terminals 23 and 24 are preferably rigid conductors disposed in a generally vertical direction when the vessel is in the position indicated at Figs. 1 and 2 of the drawings. Moreover, the rigidity thereof will insure that any electrical connections made thereto will be stationary connections.

In order to provide controlled heating of the liquid to be heated by the heating elements 20 and 21 within vessel 16, it is necessary to provide temperature responsive means responsive to the temperature of such liquid. To this end there is provided a bimetallic element generally designated by the reference numeral 26. In view of the very high heating capacity of the heating element 20, it will be apparent that the bottom 16a of the container or vessel 16 during the heating cycle is likely to be at a substantially higher temperature than the liquid being heated. Consequently, in order that the bimetallic element or temperature responsive device 26 responds closely to the temperature of the liquid within the vessel 16 and is more or less independent of the temperature of the heating elements employed to heat the vessel 16 and its contents, the element 26 is illustrated as being mounted within an inverted cup generally designated at 27, which inverted cup 27 protrudes a substantial distance into the vessel 16 so as to be surrounded on all but one side thereof by the liquid to be heated. As illustrated, the inverted cup-shaped member 27 is effectively a thermostat stud including an exterior annular shoulder 27a near one end thereof, with the portion of the stud extending beyond the shoulder 27a being threaded as indicated at 27b. Preferably, the threaded portion of the stud 27 is adapted to extend through an opening in the center of the bottom 16a with the shoulder 27a engaging the wall defining the bottom 16a surrounding the opening therein. Thus, by means of a suitable clamping nut 28 the thermostat stud 27 may be clamped into position to the bottom 16a in the manner clearly shown in Figs. 3 and 4 of the drawings. As will become apparent from the ensuing description, the base 18 is a hollow, cup-shaped member defining a chamber 29 therein which may be designated as a control chamber disposed beneath the bottom 16a of the vessel 16. It is desirable for the temperature responsive device or bimetallic element 26 as illustrated to extend into this control chamber to perform the desired control functions.

In order to support the bimetallic element 26 within the inverted cup-shaped member 27 designated as a thermostat stud, the latter is provided at the end thereof remote from the threaded end with an extension 27c provided with a slotted opening 30 therein to receive the upper end of the bimetallic element 26. The narrow extension 27c at the top of the inverted cup-shaped member can then be deformed or staked as indicated at 31 so that the deformation preferably enters an opening 32 defined in the upper end of the bimetallic element 26, thus firmly securing the bimetallic element in position. Preferably, the slot 30 is then soldered so as to provide a leakproof construction. Also, after assembly of the thermostat stud 27 with the vessel 16, the junction between the bottom 16a and the flange 27a is preferably also tinned or soldered to insure a leakproof bottom with the thermostat mounted within the cup-shaped member 27 extending a substantial distance into the vessel 16. The bimetallic element 26 is then mounted in cantilever fashion, with the upper end thereof fixed and with the lower end extending into chamber 29, free to deflect to perform a suitable control function. Secured to the lower end of the bimetallic element 26 are two insulating control buttons 34 and 35 which are adapted to actuate control switches in a manner described hereinafter. These buttons may be formed of any suitable insulating material which will not be affected adversely by the high temperatures to which they might be subjected.

For the purpose of insuring that the bimetallic element 26 will provide the same performance whether a small amount or a large amount of liquid is being heated in the vessel 16, it is necessary to shield the bimetallic element 26 against direct radiation from the heating elements, and, specifically, from the high heating element 20. To this end there is provided a shielding cup 37 which may be formed of stainless steel or the like, and which preferably has such a circumference as to engage the annular shoulder 16b in a manner so that a small portion of the bottom 16a is snugly nested therein, as is clearly shown in Figs. 3 and 4 of the drawings. Preferably, the shield is held in position by a spiderlike switch mounting plate bracket 38, best shown in Figs. 3, 4 and 6 of the drawings. This switch mounting plate bracket 38 comprises a central annular portion with an opening therein into which the portion of stud 27 below shoulder 27a may extend. A pair of diametrically opposed leg portions 38a, as best shown in Figs. 3 and 6 of the drawings, are adapted to extend through an opening at the center of the shield 37 and engage the bottom thereof, as is clearly shown in Fig. 3. Actually, the legs 38a are provided with laterally extending end portions which engage the bottom of the cup-shaped shield 37, and are preferably welded thereto. The clamping nut 28, therefore, in addition to holding the stud 27 in position also holds the switch mounting plate bracket 38 in position, which in turn holds the shielding cup 37 in the position shown in Figs. 3 and 4 of the drawings. The switch mounting plate bracket is also provided with a pair of diametrically opposed legs 38b, which are disposed at right angles to the legs 38a and to which, as is described hereinafter, is secured a suitable switch mounting plate and the like.

It will be observed from the above description that the high wattage heating element 20 is disposed at a substantial distance from the bimetallic element 26 so that the latter is responsive to the temperature of the liquid within vessel 16, and is pretty much independent of the temperature of the heating element 20. The low wattage heating element 21, on the other hand, surrounds the thermostat element 26 and is in fairly close proximity thereto, which proximity position is employed to perform a desired control operation, as will become apparent from the following description. The stud 27 is constructed to reduce heat conduction between the heating elements 20 and 21 and the thermostat element 26, whereby the latter will respond more accurately to the temperature of the liquid contained in vessel 16. To this end the stud 27 is preferably formed of stainless steel and the walls thereof are of relatively thin cross section thus insuring a minimum of heat conduction from the threaded end 27b to the extension 27c.

As was pointed out above, the reason that two separate heating elements are employed is to insure very rapid heating of the contents of vessel 16 without permitting the contents to boil over or even permitting excessive steaming or bubbling. The high wattage heating element 20 insures that the temperature of the liquid to be heated is brought up very rapidly almost to the boiling point, but the heating capacity is so great that if it were left on until the liquid came to a boil, it would boil so violently as to splash the liquid out of the vessel 16. Therefore, means are provided to render the high wattage element ineffective a few degrees below the boiling point to permit continued heating to occur by a much lower wattage element which, however, must have sufficient heating capacity to bring the water to the boiling point in a reasonably short period of time. Preferably, suitable control means described in detail hereinafter are provided to render the high wattage heating element ineffective when the temperature of the liquid within the vessel 16 reaches about 205° F. To raise the temperature of the liquid the remaining seven degrees to bring the water to boiling temperature, a heating means is employed which will insure the attainment of the boiling temperature within a reasonably short period of time but without any danger of boiling over and with assurance that the boiling temperature will be maintained thereafter. To accomplish this in accordance with the present invention and as best shown in the schematic diagram of Fig. 8 of the drawings, where the corresponding parts are designated by the same reference numerals as the other figures of the drawings, two independent switches designated as 40 and 41, respectively, are provided to be actuated by bimetallic element 26. The switch 41 is illustrated as the control switch for controlling the effectiveness of the high wattage element 20, and, as illustrated in the drawings, is connected in series solely with the high wattage heating element 20 and a power source designated as 42, which is preferably the conventional 115 volt alternating current power source available in substantially all homes in this country today. The switch 40, on the other hand, is a safety switch which is connected in circuit with the heating elements 20 and 21 in series. The opening of switch 40, which is set to open at a temperature substantially above the boiling temperature of water, will deenergize completely the heating elements 20 and 21, since when switch 40 is open, switch 41, which is set to operate at about 205° F., is obviously also open. From Fig. 8 it will be apparent that when switch 41 is closed, the 1150 watt heating element 20 will be effective to cause rapid heating of the contents of vessel 16. On the other hand, as soon as switch 41 opens, the 1150 watt heating element 20 is connected in series with the 200 watt heating element 21 so as to supply something less than 200 watts in the form of heat energy to the contents of vessel 16.

Considering now the structural details of the circuit schematically shown in Fig. 8, and specifically the structure of switches 40 and 41, reference should be had in addition to Fig. 8 to Figs. 3, 4, 5 and 7 of the drawings. To avoid the requirement of a large number of independent insulating members, there has been provided in accordance with the present invention a switch mounting plate 44 formed of a suitable insulating material which will readily withstand the temperatures encountered within the chamber 29. In an electric heating device built in accordance with the present invention, this switch mounting plate 44 was formed of a glass laminate with a silicone resin binder. As illustrated, the switch mounting plate 44 is secured by suitable fastening means 45 to the legs 38b of the spiderlike switch mounting plate 38. The switch mounting plate 44 is disposed within the chamber 29 at a distance below the bottom of the shielding cup 37 and parallel with the bottom of that shielding cup. All electrical connections to the switches 40 and 41 are then made to members supported on the switch mounting plate.

It is conventional practice in electric heating devices today to provide parallel disposed terminal studs such as 47 and 48 whereby the heating device may readily be connected to a source of electrical energy such as power source 42. To support the terminal studs 47 and 48 in spaced parallel relationship on the heating device 15, there is provided a receptacle bracket 49, which is illustrated as of somewhat U-shape, having one leg of the U designated as 49a welded or otherwise secured to the bottom of the shielding cup 37. In this manner the bight portion of the U-shaped receptacle bracket 49 is disposed in a vertical direction within the chamber 29 and is provided with suitable openings and associated insulating means so that the terminal studs 47 and 48 may be clamped thereto as indicated in Figs. 5 and 7 of the drawings in insulated relationship therewith. The details of construction of the terminal studs and the mounting means therefor form no part of the present invention. As illustrated in the drawings, the terminal stud 48 is connected by means of a rigid conductor 50 with the terminal 23b of the high wattage heating element 20. The terminal stud 47, on the other hand, is connected by a somewhat L-shaped conductor 51 to a somewhat U-shaped switch leaf bracket 52 which is secured to the insulating switch mounting plate 44 as by rivets 53. The switch leaf bracket 52 is effectively a mounting means for leaf springs 54 and 55 of switches 40 and 41, respectively, the ends of which springs are preferably welded to the upstanding leg portions of U-shaped switch leaf bracket 52. The switch 40 is illustrated as comprising contacts 40a and 40b, while the switch 41 is illustrated as comprising contacts 41a and 41b. The contacts 40a and 41a are effectively the movable contacts of the switches 40 and 41, respectively, and are supported on leaf springs 54 and 55, respectively. The ends of the leaf springs most remote from contacts 40a and 41a are secured to the legs of the U-shaped switch leaf bracket so that the leaf springs extend toward each other with the free ends thereof disposed in the path of movement of the actuating buttons 34 and 35 of the bimetallic element 26. As illustrated, the free end of the leaf spring 54 is in the path of movement of the insulating button 34, while the free end of leaf spring 55 is in the path of movement of the insulating button 35. Obviously, the movable contacts 40a and 41a will be moved in the same manner by the bimetallic element 26 so that to operate at different temperatures it is necessary to adjust the positions of switch contacts 40b and 41b, which may effectively be considered the stationary contacts, although their position is adjustable for varying the temperature settings, as will become apparent from the following description.

For the purpose of supporting the stationary contacts 40b and 41b of the switches 40 and 41, respectively, there are provided a pair of switch brackets 59 and 58, respectively, which are substantially identical except one is a left-hand bracket and the other is a right-hand bracket. These brackets are of somewhat U-shaped configuration with legs 58a and 59a thereof disposed parallel with the insulating plate 44 and preferably engaging the bottom thereof. Suitable rivets 60 extending through the leg portions 58a and 59a secure the left-hand and right-hand switch brackets 58 and 59 to the switch mounting plate 44. With this arrangement the bight portions of the U-shaped switch brackets 58 and 59 extend in a vertical direction above insulating switch plate 44. Secured to these bight portions are switch arms 62 and 63, the switch arm 62 being supported from the bight of bracket 59 and supporting relatively stationary contact 40b, while the switch arm 63 is supported from the bight of bracket 58 and, in turn, supports relatively stationary contact 41b. The other leg 58b of bracket 58 is disposed above insulating plate 44 in a plane parallel with the plane of the leg portion 59a of bracket 59. Similarly, the leg portion 59b of bracket 59 is disposed in the plane of bracket portion 58b.

To provide accurate adjustment of the temperatures at which the switches 40 and 41 operate, there is provided for each switch arm 62 and 63 an adjusting screw designated as 65 and 66, respectively. These adjusting screws threadedly engage threaded openings in the leg portions 59a and 58a of brackets 59 and 58, respectively. Moreover, these adjusting screws are provided with portions of reduced cross section 65a and 66a which extend through suitable openings defined in the leg portions 59b and 58b, respectively, of the brackets 59 and 58. Each of the adjusting screws 65 and 66 is illustrated as having a conical portion designated as 65b and 66b, adapted to engage with a protuberance provided on the associated contact arm. Thus, the contact arm 62 of switch 40 is provided with a protuberance 62a engageable with the conical portion 65b of adjusting screw 65. Similarly, the switch arm 63 of switch 41 is provided with a protuberance 63a engageable with the conical portion 66b of adjusting screw 66. Obviously, by rotating the adjusting screws, the conical portions thereof will move in a vertical direction and will cause the stationary contacts 40b or 41b to move away from or toward the movable contacts 40a and 41a, respectively. The inherent resilience of switch arms 62 and 63 will bias the associated protuberances 62a and 63a into engagement with the effective conical portions of adjusting screws 65 and 66, respectively. To complete the electrical circuit, the bracket 58 associated with switch 41 is electrically connected by means of a conductor 68 with the terminals 23a and 24a of heating elements 20 and 21, respectively. Similarly, the bracket 59 is connected by a conductor 69 to the terminal 24b of heating element 21. These conductors are all rigid conductors to avoid the possibility of a short circuit.

It would be desirable for the operator to know whether or not the control switch 40 for the main heating element 20 has opened, and to this end there is preferably provided an indicating light 70 connected across the high wattage heating element 20. Preferably, a suitable current limiting resistor 71 is connected in series with indicating light 70. As illustrated in the drawings, an insulated conductor 72 connects one terminal of indicating light 70 to bracket 58. The other terminal of indicating light 70 is preferably connected by a conductor and the resistor 71, which are disposed within an insulating sheath designated as 73 to the terminal stud 48. It will be appreciated that when the switch 41 is opened, a decrease in voltage drop across high wattage heating element 20 will result. The voltage drop across resistor 20 under these conditions is insufficient to cause indicating light 70 to be lighted.

The base 18 described above is preferably formed of a phenolic insulating material, and may be of the same color and material as the handle 19. As illustrated in the drawings, the base 18 is a cup-shaped member defining therein the chamber 29. For the purpose of securing the base 18 to the vessel 16, there is provided a Z-shaped bracket 75 having one leg thereof welded or otherwise secured to the reflector cup 37, as is best shown in Fig. 4 of the drawings. The other leg of the Z-shaped element is provided with a tapped opening to receive a suitable fastening means 76. Additionally, the leg 49b of receptacle bracket 49, which is parallel with the bottom of base 18, is also provided with a tapped opening to receive a similar fastening means 76. These fastening means firmly secure the base 18 to the brackets 75 and 49, which, in turn, are secured to the cup-shaped shield 37, the latter being secured by the spiderlike switch mounting plate bracket 38 to the vessel 16.

In order that the terminal studs 47 and 48 are accessible, the cup-shaped base mmeber 18 is provided with a suitable opening 79 through which the terminal studs 47 and 48 project. The opening 79 is preferably of oblong shape and of a size to accommodate the conventional plug receptacle commonly employed with electrical appliances.

As is best shown in Fig. 3 of the drawings, the bottom of the base 18 is preferably provided with openings 80 and 81 to afford ready access to the adjusting screws 66 and 65, respectively. Since the adjusting screw 65 controls the switch 40, which effectively is a safety switch interrupting the circuit in case the vessel 16 should run dry, the setting thereof is not critical and, hence, the setting of screw 65 is a factory adjustment and need not be actuated by the purchaser of the instant coffee and tea maker of the present invention. Therefore, to close the access opening 81, there is preferably provided a bottom closure plate 85, which is secured to the bottom of base 18 as by screws 86. The adjusting screw 66, however, should be set to render the high wattage heating element 20 ineffective a few degrees below the boiling point of the liquid being heated in order to prevent violent bubbling and steaming and boiling over of the liquid. Since the boiling point of liquid, and specifically water, varies with altitude, the adjusting screw 66 might be considered the altitude adjustment, and if the device 15 is to be used at high altitudes, an adjustment must be made. Accordingly a suitable actuating button 88 is provided which has a recess 88a to receive the head of adjusting screw 66. Preferably, this recess has a knurled interior or other suitable configuration to grip the head of the adjusting screw 66. An opening 89 defined in bottom closure plate 85 affords access to the button 88 having a peripheral flange larger than the opening 88 so as to be held in position by the cover plate 85. Preferably, the button 88 is provided with a screw driver slot in the bottom thereof, not shown, and preferably also suitable indicia is provided on the cover plate 85 adjacent the opening 88 to indicate the direction of rotation of the button 88 for raising or lowering the effective cut-off temperature of switch 41.

In order that the lamp 70 may be visible to the operator, the base 18 is preferably provided with an integrally formed frame portion 18a surrounding an opening 90. The frame portion 18a is provided with an undercut portion slidably to receive an escutcheon plate 91 which has an opening therein to receive a suitable lens 92, the latter preferably being formed of a suitable transparent plastic material. The lens 92 preferably fits into an opening defined in the escutcheon plate 91 disposed adjacent the lamp 70. In order to hold the escutcheon plate 91 and lens 92 in assembled relationship, the lower portion of the escutcheon plate is provided with a recess 93 to receive a suitable clip 94 secured to the base as by fastening means 95. In this way the escutcheon plate and associated lens may be slid into position in the frame 18a, and the clip 94 secured in position to maintain the whole in assembled relationship.

In order to support the lamp 70 in position closely adjacent the lens 92, there is provided a lamp supporting clamp 96 which may be secured as by riveting to the reflecting cup 37. A plastic wrap-around lamp support 97, which, as its name implies, wraps around the lamp, is secured to the supporting clamp 96 as by fastening means 98 and a clamping support 99. The plastic wrap-around material may be transparent plastic material or at least translucent so as to permit light from the lamp 70 to pass through the lens 92.

In view of the detailed description included above, the operation of the heating device 15 will readily be understood by those skilled in the art. With the altitude adjustment screw 66 set to open the switch 41 a few degrees below the boiling temperature of the liquid to be heated, and with the adjusting screw 65 set so that the switch 40 opens at a temperature substantially above the boiling temperature of the water but low enough to prevent any damage to the controls or the heating elements, the device may be set in operation by connecting a suitable power cord between the source of power 42 and the terminal studs 47 and 48. Under these conditions, the thermostat 26 will be in such a position that both switches 40 and 41 are closed, and, of course, the high heating element 20 is effective to produce very rapid heating of any liquid contained in vessel 16. Just below the boiling temperature of the liquid to be heated, switch 41 opens to render the high heating element 20 ineffective, and continued heating is then carried on by virtue of the current flowing through heating elements 20 and 21 in series. These heating elements connected in series will insure that the boiling temperature of the liquid is reached in a short time, but will further insure that no violent bubbling or steaming occurs. When the low wattage heating element 21 is rendered effective, its close proximity to the bimetallic element 26 has a temperature increasing effect thereon to insure that contacts 41a and 41b of switch 41 cannot reclose. Hence, contacts 41 operate only once during a cooking cycle resulting in a minimum of wear and a minimum of change in adjustment of the contacts of switch 41. The bimetallic element 26 will then maintain the boiling temperature of the liquid. Should the vessel 16 boil dry for any reason, the switch 40 will open at a temperature considerably above the boiling point to insure that no damage to the vessel will occur.

While there has been illustrated and described a particular embodiment of the present invention, various changes and modifications will occur to those skilled in the art. It is intended in the appended claims to cover all those changes and modifications which fall within the true spirit and scope of the present invention.

What is claimed as new and desired to be secured by Letters Patent of the United States is:

1. A liquid heating device comprising a heating vessel, high and low wattage heating means disposed in good heat transfer relationship with said vessel, and temperature responsive means responsive to the temperature of liquid contained within said vessel for causing the selective energization of said high and low wattage heating means in response to the temperature within said vessel, said temperature responsive means including means for rendering said high wattage heating means ineffective when the temperature of said liquid is slightly below the boiling point thereof.

2. A device for heating water for instant coffee or tea comprising a container, electric heating means disposed in heat transfer relationship with said container, an insulating panel supported from said container in spaced and substantially parallel relationship with the bottom of said container, switch means in circuit with said electric heating means mounted on said panel, all electrical connections with said switch means and heating means being made to means supported on said panel, and an insulating housing secured to said container and enclosing said panel and associated circuitry.

3. In an instant coffee and tea maker comprising a vessel, electric heating means for heating said vessel, and means for selectively supplying current to said heating means, said last named means being responsive to the temperature in said vessel appreciably to reduce the current supplied to said heating means thereby to reduce the heat given off by said heating means when the temperature in said vessel exceeds a first predetermined value and for completely terminating the supply of current to said heating means when the temperature in said vessel exceeds a second predetermined value, said one predetermined value being less than the boiling point of water and the other being greater than the boiling point of water.

4. The instant tea and coffee maker of claim 3 in which said means responsive to temperature includes a bimetallic element and a pair of independent switches selectively actuable by said bimetallic element as it is deformed in response to changes in the temperature of material disposed in said vessel.

5. An instant coffee and tea maker comprising a heating vessel, heating means for heating said vessel, temperature responsive means, said temperature responsive means comprising a bimetallic element disposed in a vertical direction including a portion thereof extending into said vessel, an inverted cup-shaped member for enclosing said portion of said bimetallic element, a switch assembly connected in circuit with said heating means and controlled by said bimetallic element, and means for holding said cup-shaped member in position in said vessel and simultaneously supporting said switch assembly from said vessel.

6. A heating device comprising a vessel, a downwardly facing peripheral rabbet on the bottom of said vessel, a heating element, means for mounting said heating element in good heat transfer relationship with the bottom of said vessel, a switch mechanism for controlling the energy supplied to said heating element, a cup-shaped shield partially enclosing said heating element and shielding it from said switch mechanism, the upstanding marginal edges of said shield being disposed in said rabbet, and a cup-shaped housing having the peripheral edges thereof disposed in said rabbet over said shield, said housing enclosing said shield and said switch mechanism.

7. A heating device as set forth in claim 6 wherein said shield is constructed of sheet metal and said housing is formed of a heat insulating and electrical insulating material.

8. A heating device comprising a heating vessel, high and low wattage heating means each disposed in good heat transfer relationship with the bottom of said vessel, said heating means being spaced apart, the elevation of the portion of the bottom of said vessel in good heat transfer relationship with said low wattage heating means being less than the elevation of the portion of the bottom of said vessel in good heat transfer relationship with said high wattage heating means, and temperature responsive means comprising a single bimetallic element responsive to the temperature of the material contained in said vessel for causing the selective energization of said high and low wattage heating means, said temperature responsive means being operative selectively to effectively deenergize said high wattage means when the temperature of the material contained in said vessel exceeds a first predetermined value and to deenergize said low wattage means when said temperature exceeds a second predetermined value, said second value being greater than said first value.

9. The heating device of claim 8 in which said low wattage heating means is disposed intermediate said high wattage heating means and said temperature responsive means and being adapted to shield said temperature responsive means from the heat radiated from said high wattage heating means.

References Cited in the file of this patent

UNITED STATES PATENTS

| Re. 23,804 | Jepson | Mar. 23, 1954 |
|---|---|---|
| 1,318,168 | Newsom | Oct. 7, 1919 |
| 1,437,005 | Newsom | Nov. 28, 1922 |
| 1,947,426 | Smith | Feb. 13, 1934 |
| 2,175,727 | Graham | Oct. 10, 1939 |
| 2,287,580 | Wagner | June 23, 1942 |
| 2,526,861 | Getchell | Oct. 24, 1950 |
| 2,565,638 | Victory | Aug. 28, 1951 |
| 2,576,432 | Wilcox | Nov. 27, 1951 |
| 2,610,284 | Kolisch | Sept. 9, 1952 |
| 2,658,134 | Kircher | Nov. 3, 1953 |
| 2,686,241 | Straub | Aug. 10, 1954 |
| 2,696,159 | Marquis | Dec. 7, 1954 |
| 2,712,055 | Campbell | June 28, 1955 |
| 2,735,912 | Ulanet | Feb. 21, 1956 |
| 2,763,767 | Lohrman et al. | Sept. 18, 1956 |
| 2,798,143 | O'Brien | July 2, 1957 |

FOREIGN PATENTS

| 474,502 | Canada | June 12, 1951 |